2,837,460

PERTUSSIS VACCINE PREPARATION

Otto K. Behrens and Paul W. Ensminger, Indianapolis, Ind., assignors to Eli Lilly and Company, Indianapolis, Ind., a corporation of Indiana No Drawing. Application October 23, 1952
Serial No. 316,566

7 Claims. (Cl. 167—78)

This invention relates to an antigen derived from *Hemophilus pertussis*, and to the process for its preparation.

Whooping cough is a serious disease of infancy, responsible for numerous fatalities in unimmunized children. It has heretofore been possible to immunize children against whooping cough by the use of vaccines. Such vaccines commonly consist of a suspension of killed *Hemophilus pertussis* organisms in saline alone, or in saline and alum, the latter being known as alum-precipitated vaccine. Those vaccines, while efficacious, are not without certain inherent disadvantages. For example, their use has resulted in numerous cases of sterile abscesses among those immunized. Furthermore, toxic symptoms, as evidenced by fever and irritation of the tissues after the vaccine has been injected, are common side reactions, even where necrosis or other severe inflammatory reactions do not occur. In some instances, encephalitis has resulted from immunization with the known vaccines.

It is an object of this invention to provide an antigen derived from *Hemophilus pertussis* cells which is substantially non-irritating to the tissues into which it is administered, yet which is capable of providing a lasting immunity in human beings. It is another object of this invention to provide a preparation capable of evoking an immunity against whooping cough. It is a further object of this invention to provide an antigen which is characterized by the absence therefrom of bacterial toxins, cells and debris. Other objects will be apparent from the disclosures made hereinafter.

In accordance with the above and other objects, we have discovered that a useful antigen for immunization against whooping cough, having extremely low toxicity both systemically and locally can be prepared by extracting intact *Hemophilus pertussis* cells with an aqueous solution containing a controlled amount of a phonolic compound.

In broad outline, the manner of carrying out this invention for preparing pertussis vaccine is as follows:

*Hemophilus pertussis* is cultured upon agar or charcoal-agar media in accordance with the usual methods employed for the preparation of pertussis vaccine, and the bacterial growth is harvested by washing the bacterial cells from the agar growth medium with water or saline solution. To the suspension of bacterial cells is added a controlled amount of a phenolic compound, and the cells are allowed to stand in contact with the solution of the phenolic compound for from one to three weeks during which time the antigenic material is extracted from the cells. The mixture is shaken from time to time to assist the extraction, the shaking being carried out sufficiently gently so that the cells will not be disrupted.

The intact cells are separated from the extraction solvent as by centrifugation or filtration, leaving a centrifugate or filtrate comprising the antigenic material dissolved in the aqueous solution of the phenolic compound.

In cases where the aqueous phenolic solution has a phenolic concentration greater than about 0.5 percent, the concentration later is reduced to an amount not greater than about 0.5 percent, to provide a vaccine which can be administered parenterally without untoward effects caused by the phenolic compound. Reduction can be secured by any suitable procedure, for example, by solvent extraction, or by dialysis. Throughout the process, aseptic conditions should be observed as is standard practice in the preparation of vaccines.

The antigen-containing solution thus produced is a clear, colorless liquid having an antigenic potency which is proportional to the number of cells present in the original bacterial suspension. The solution is standardized by assay procedures of the National Institutes of Health, which consist of the injection into mice of the antigenic material with the production of a typical immunity against challenge doses of virulent pertussis organisms. After standardization, the antigenic solution can be brought to the strength desired by dilution or by evaporation in vacuo at room temperature to provide a vaccine of desired potency. The vaccine can also if desired, be treated with alum in accordance with customary procedures to give an alum-precipitated vaccine. The vaccines, whether clear or alum-precipitated are filled under aseptic conditions into dosage containers suitable for distribution to the trade.

Unlike the hitherto employed cell-suspension type vaccines, which when injected intradermally in test animals such as rabbits, often cause dermal irritation including severe inflammatory reactions and even necrosis, the antigen solutions of this invention, derived from suspensions containing equal numbers of bacterial cells, generally produce no reactions. At the most, only mild reactions have ever been noted in animal and human clinical tests.

The absence of side effects after administration of the vaccines prepared as described herein are shown in the following table in which are set forth the results of comparative intradermal skin tests on red rabbits. The tests employ pertussis antigen consisting of cellular material prepared in accordance with conventional procedure, and cell-free pertussis antigen prepared in accordance with this invention. In the table, the first column indicates the material employed in the test as set forth in the data below the table. In each instance 0.2 ml. of the preparation was injected intradermally. The second column indicates the total number of cells injected. It should be noted that with lots B, C, D, and E no cells were injected, the cell numbers used in connection with these being the concentration of cells in each ml. of the original suspension which was extracted. The third column indicates the A. U. (antigenic units) injected, this figure being determined by the mouse test method of the National Institutes of Health. The fourth, fifth and sixth columns represent respectively the results of the observations for unfavorable reactions after administration of the antigen, the observations being made respectively 24, 48 and 72 hours after the intradermal injection of the test animals. The areas of redness and necrosis observed were measured.

As used herein, the term A. U. is an expression of the antigenicity of the vaccine as compared with that of the standard vaccine provided by the National Institutes of Health. That standard employing 20 billion cells per ml. of vaccine has an A. U. value of 20.

TABLE

| Lot No. | Cells injected per skin test area | A. U. injected per skin test area | Skin reaction | | |
|---|---|---|---|---|---|
| | | | 24 Hr. | 48 Hr. | 72 Hr. |
| A | 7.3 Bil | 10.2 | Raised, Red 9 x 11 mm | Raised, Red 9 x 10 mm., Necrosis 3 x 3 mm. | Raised, Red 9 x 10 mm., Necrosis 3 x 3 mm. |
| | 3.65 Bil | 5.1 | Raised, Red 9 x 9 mm | Raised, Red 9 x 7 mm | Raised, Red 9 x 7 mm. |
| | 1.825 Bil | 2.55 | Raised, Red 4 x 5 mm | Raised, Red 6 x 8 mm | Raised, Red 6 x 8 mm. |
| | 912 ½ Mil | 1.28 | Red 3 x 3 mm | Red 5 x 5 mm | Red 5 x 5 mm. |
| | 456¼ Mil | 0.64 | Red 2 x 2 mm | Red 3 x 3 mm | Red 3 x 3 mm. |
| | 228⅛ Mil | 0.32 | Negative | Red 2 x 2 mm | Red 2 x 2 mm. |
| | 114 1/16 Mil | 0.16 | ----do---- | Slightly Red | Slightly Red. |
| | 57 Mil | 0.80 | ----do---- | Negative | Negative. |
| B | 58.4 Bil | 20.3 | ----do---- | ----do---- | Do. |
| C | 58.4 Bil | 39.6 | ----do---- | ----do---- | Do. |
| D | 58.4 Bil | 29.7 | ----do---- | ----do---- | Do. |
| E | 58.4 Bil | 45.5 | ----do---- | ----do---- | Do. |

Lot A: A commercial vaccine containing cell material together with sodium ethyl mercuri thiosalicylate 1–10,000 and formaldehyde 1:1000.
Lot B: A vaccine prepared by extraction of cells with 0.2 percent aqueous phenol at 4°C. for 14 days.
Lot C: A vaccine prepared by extraction of cells with 0.2 percent aqueous m-cresol at 4° C. for 14 days.
Lot D: A vaccine prepared by extraction of cells with 0.2 percent aqueous phenol at 25° C. for 14 days.
Lot E: A vaccine prepared by extraction of cells with 0.2 percent aqueous m-cresol at 37° C. for 14 days.

In employing the extraction process of this invention, the extraction step is carried out at a temperature between about 4° C. and about 40° C. The most efficient extraction temperature appears to be about 37° C. At that temperature, extraction of antigenic material is substantially complete after about 14 days, and the vaccine prepared from the extract is substantitally free from materials which cause side effects. Increase of the extraction temperature above 40° C. has an unfavorable effect on the quantity and quality of the vaccine produced.

Numerous phenolic compounds can be employed to furnish the phenolic content of the aqueous extraction solvent. Among the phenolic compounds which provide the most satisfactory results, both with respect to the antigenic potency and the freedom from irritating substances of the vaccines produced, are the cresols, the mononitrophenols, phenol, and carvacrol. Other examples of phenolic compounds which can be used include the chlorophenols, hydroquinone, catechol, resorcinol, 2,4-dinitrophenol, pyrogallol, picric acid, phloroglucinol, and the like. Additional phenolic compounds suitable for the purposes of this invention will readily be apparent.

To provide effective extraction of the antigenic material but not extraction of irritating substances, the amount of phenolic compound employed in the aqueous extraction solvent should be from about 0.05 to about 2.0 percent, on a weight-volume basis. Concentrations above the upper limit have an increasingly destructive effect upon the antigen, and concentrations below the lower limit have but little extractive ability. A concentration of about 0.2 percent is preferred since that concentration provides efficient extraction, but yet is below the upper permissible concentration in the final vaccine. Moreover, such a concentration of phenolic content is desirable for preservative purposes.

The following examples further illustrate this invention.

Example 1

Ten liters of charcoal agar were prepared according to the procedure described by H. M. Powell et al., Public Health Reports 66, 346 (1951), and were placed in twenty toxin bottles containing 500 ml. of media. Each bottle was seeded with 12 ml. of a stock 24-hour smooth culture of Hemophilus pertussis. The seeded bottles were incubated at 37° C. for 48 hours, and the organisms thus cultured were washed from the surface of the charcoal agar in each bottle with 50 cc. of 0.85 percent aqueous sodium chloride. About 1,000 ml. of a suspension of bacterial cells were obtained. The suspension was diluted with 277 ml. of normal saline solution so that the final cell count was about 180 billion cells per ml. To the suspension were added 20 g. of phenol, and the mixture was stored at a temperature of about 4–6° C. for fourteen days, with occasional shaking to resuspend the cells. After fourteen days, the mixture was centrifuged at about 13,000 R. P. M. for about one hour, and the supernatant liquid was decanted from the cell sediment. The clear antigen-containing solution thus obtained was tested for potency by injection into mice in accordance with the standard NIH mouse immunization test.

The clear antigen solution was placed in sterile, cellophane dialysis sacks and dialysed against several changes of pure water over a period of three days, thereby reducing the phenol concentration to a value of about 0.3 percent. The volume increase of the dialysed solution was removed by evaporation in vacuo at room temperature, and the antigenic potency of the solution was tested by the NIH procedure. The antigenic solution contained about 114 A. U. per ml.

Example 2

To 200 ml. of an antigen solution prepared according to the procedure of Example 1 was added about 50 ml. of 20 percent potassium aluminum sulfate dodecahydrate and 16.6 ml. of 50 percent dibasic sodium phosphate solution. The mixture was allowed to stand about four hours with occasional shaking and the precipitate containing the antigenic material which formed was separated from the liquid by centrifugation at about 14,000 R. P. M. The precipitate which contained the alum-precipitated antigenic material was resuspended in 200 ml. of normal saline solution, and tested for immunizing potency in mice according to the standard test method. The test showed the presence of about 63 A. U. per ml.

Example 3

To about 1000 ml. of a suspension of Hemophilus pertussis cells prepared according to the procedure of Example 1 and containing about 180 billion cells per ml., were added about 2 g. of phenol. The mixture was stored at about 6° C. for about fourteen days, with intermittent shaking to resuspend the cells. At the end of fourteen days, the suspension was centrifuged at about 13,000 R. P. M. for about one hour and the supernatant liquid, containing the extracted antigen, was subjected to mouse tests for antigenicity. The solution contained about 62 A. U. per ml.

Example 4

To about 1000 ml. of a suspension of Hemophilus pertussis cells prepared according to the procedure of Example 1 and containing about 180 billion cells per ml. were added about 2 g. of phenol, and the material was stored at about 37° C. for two weeks, during which time the suspension was gently agitated from time to time to resuspend the cells. The suspension was thereafter centrifuged at about 13,000 R. P. M. for about one hour and the supernatant liquid containing the extracted antigen was subjected to mouse assay tests to determine its immunizing potency. The solution contained about 92 A. U. per ml.

*Example 5*

The procedure of Example 3 was followed, except that 2 g. of o-cresol were added to the cell suspension.

Upon assay of the antigen solution thus prepared, it was found that the antigen solution contained 130 A. U. per ml.

*Example 6*

The procedure of Example 3 was followed, but using instead of phenol 2 g. of m-cresol. The cell count of the cell-suspension was about 168 billion cells per ml. of suspension.

Mouse assays showed that the resulting antigen solution contained 136 A. U. per ml.

*Example 7*

The procedure of Example 3 was repeated, except that 2 g. of o-chlorophenol were added to the cell suspension. Final cell count was 168 billion cells per ml.

Assay by standard mouse protection methods showed the presence of 27 A. U. per ml.

*Example 8*

The procedure of Example 3 was followed, except that 2 g. of p-nitrophenol were added to the cell suspension. Cells were extracted at 168 billion per ml.

Mouse assays showed that the resulting antigen solution contained 12 A. U. per ml.

*Example 9*

The procedure of Example 3 was repeated, except that 2 g. of o-nitrophenol were added to the cell suspension. Cells were extracted at 168 billion per ml.

Mouse tests showed the presence of 30 A. U. per ml. in the resulting antigen solution.

*Example 10*

The procedure of Example 3 was followed, except that 2 g. of carvacrol were added to the cell suspension.

Mouse assays indicated that the resulting antigen solution contained about 22 A. U. per ml.

We claim:

1. A method of preparing a reaction-free antigen for immunization against *Hemophilus pertussis* which comprises extracting intact cells of *Hemophilus pertussis* for a period of about 1 to about 3 weeks with an aqueous solution of about 0.1 to about 0.2 percent on a weight/volume basis of a phenolic compound of the group consisting of phenol, cresol, chlorophenol, nitrophenol, and carvacrol, separating the extract from the intact cells, and adjusting the concentration of the phenolic compound in the separated extraction solution to a value less than about 0.5 percent.

2. A method of preparing a reaction-free antigen for immunization against *Hemophilus pertussis* which comprises extracting intact cells of *Hemophilus pertussis* for a period of about 1 to about 3 weeks at a temperature between about 4° C. and about 40° C. with an aqueous solution of about 0.1 to about 0.2 percent on a weight/volume basis of a phenolic compound of the group consisting of phenol, cresol, chlorophenol, nitrophenol, and carvacrol, recovering a clear aqueous antigen-containing solution by separating the aqueous phenolic extract from the intact cells, and adjusting the concentration of the phenolic compound to a value less than about 0.5 percent.

3. A method according to claim 2 in which the phenolic compound is phenol.

4. A method according to claim 2 in which the phenolic compound is o-cresol.

5. A method according to claim 2 in which the phenolic compound is p-cresol.

6. The method according to claim 2 in which the phenolic compound is o-nitrophenol.

7. A method according to claim 2 in which the phenolic compound is m-cresol.

References Cited in the file of this patent

UNITED STATES PATENTS

| | | |
|---|---|---|
| 2,340,318 | Gerlough | Feb. 1, 1944 |
| 2,701,226 | Pillemer | Feb. 1, 1945 |

OTHER REFERENCES

Dubos: The Bacterial Cell, publ. 1955, by Harvard Univ. Press, Cambridge, Mass., copyright 1945, pp. 306–308.

Flosdorf et al.: Proc. Soc. Exp. Biol. and Med., May 1939, pp. 122–126.

Krueger et al.: Proc. Soc. Exp. Biol. and Med., 1933, pp. 1097–1099.

Pittman: J. Infect. Dis. 89 (3) 300–304, 1951, as shown in Biol. Abst. 26:3, March 1952, p. 603.

Felton et al.: JAMA, 126:5, pp. 294–299, p. 295 pert., Sept. 30, 1944.

Cecil et al.: Textbook of Med., 1948, pp. 260–264 (p. 261 pert.) N. N. R., 1950, p. 448.